(12) United States Patent
Knestel

(10) Patent No.: US 6,457,352 B1
(45) Date of Patent: Oct. 1, 2002

(54) ROLLDYNAMOMETER

(75) Inventor: Anton Knestel, Hopferbach (DE)

(73) Assignee: Maha Maschinenbau Haldenwang GmbH & Co. KG. (DE)

( * ) Notice: Subject to any disclaimer, the term of this patent is extended or adjusted under 35 U.S.C. 154(b) by 0 days.

(21) Appl. No.: 09/480,453

(22) Filed: Jan. 11, 2000

(30) Foreign Application Priority Data

Jan. 11, 1999 (DE) .......................... 199 00 620

(51) Int. Cl.$^7$ ............................ G01M 15/00; G01L 5/00
(52) U.S. Cl. ........................................ 73/117; 73/862
(58) Field of Search .................... 73/116, 117, 123, 73/124, 862, 862.381

(56) References Cited

U.S. PATENT DOCUMENTS

| | | | |
|---|---|---|---|
| 1,689,584 A | 5/1928 | Grupe | |
| 1,746,780 A | 2/1930 | Langbein | |
| 2,144,010 A | 1/1939 | Bennett | |
| 3,345,865 A | 10/1967 | Ostrander | 73/117 |
| 4,077,255 A | 3/1978 | Murakami | 73/117 |
| 4,161,116 A * | 7/1979 | Fegraus et al. | 73/117 |
| 4,468,955 A | 9/1984 | Yamasaki et al. | 73/117 |
| 4,825,690 A * | 5/1989 | Mears | 73/117 |
| 4,953,391 A | 9/1990 | Schober et al. | 73/117 |
| 5,136,878 A | 8/1992 | Wolcott | 73/117 |
| 5,154,076 A * | 10/1992 | Wilson et al. | 73/117 |
| 5,269,179 A * | 12/1993 | Vattakatta et al. | 73/117 |
| 5,277,060 A | 1/1994 | Lehman et al. | 73/117 |
| 5,311,770 A * | 5/1994 | D'Angelo | 73/117 |
| 5,385,042 A | 1/1995 | Le Belle | 73/117 |
| 5,452,605 A * | 9/1995 | Wilson et al. | 73/117 |
| 5,522,257 A | 6/1996 | D'Angelo et al. | 73/117 |

FOREIGN PATENT DOCUMENTS

WO    WO 95/31705    11/1995    ............ G01L/3/00

* cited by examiner

*Primary Examiner*—Benjamin R. Fuller
*Assistant Examiner*—Maurice Stevens
(74) *Attorney, Agent, or Firm*—George T. Marcou; Kilpatrick Stockton LLP

(57) ABSTRACT

The subject matter of the invention is a rolldynamometer for motor vehicles comprising at least one running roll or drum (9) for one wheel (2) of one axis of the vehicle (1) to be examined, respectively, at least one electric motor (9) for directly driving and slowing down the running rolls (3), the stator housing (9a) of said electric motor (9) being borne in a support frame (6) in a pendulum fashion and supported on said support frame via force meters (20), and a control unit to which a running simulator for adjusting specific vehicle data and for simulating selected running conditions is allocated. For increasing the accuracy of the measurements, according to the invention, the stator housing (9a) of the driving motor (9) is borne in a lubrication oil free bearing arrangement in the support frame (6).

20 Claims, 5 Drawing Sheets

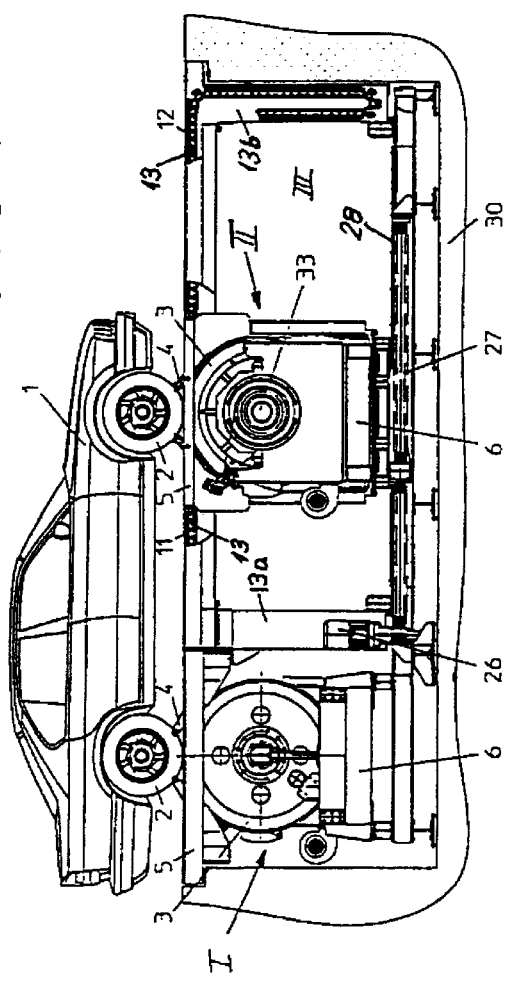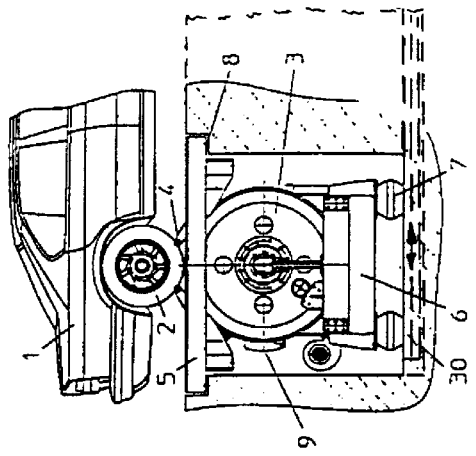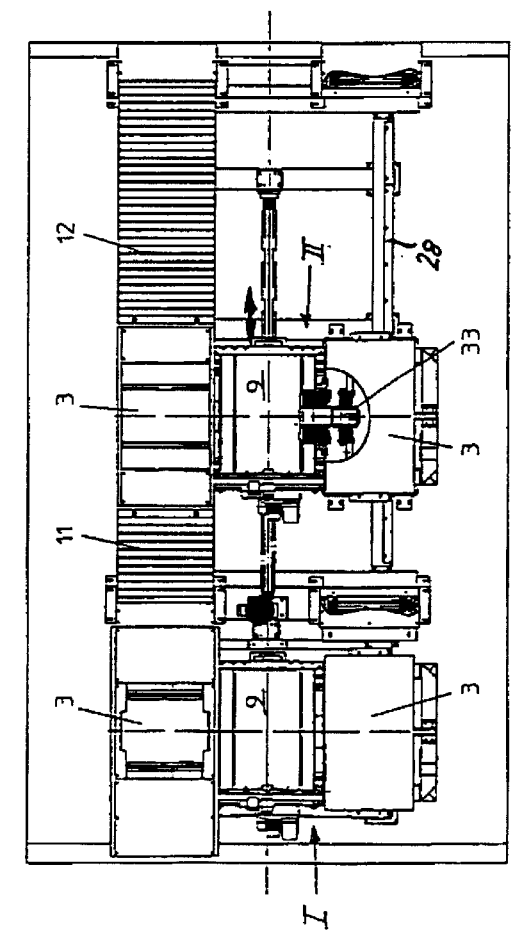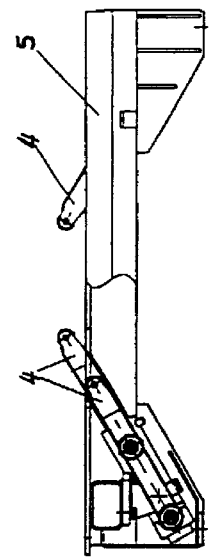

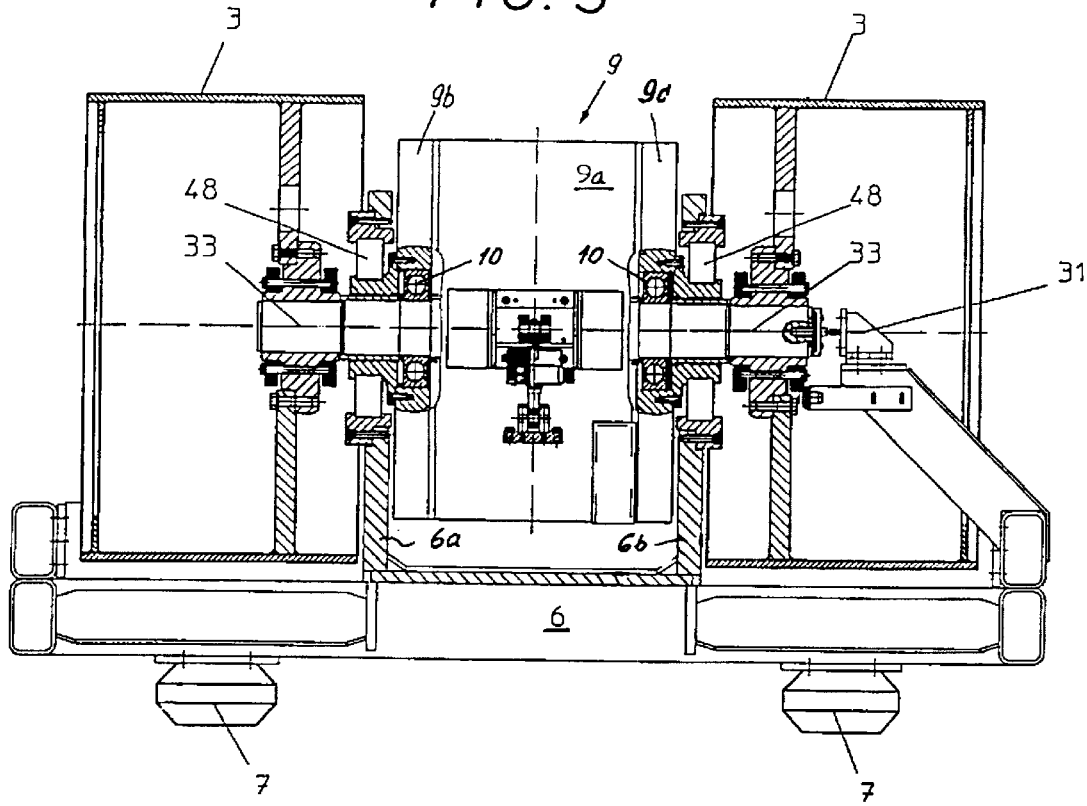
FIG. 5
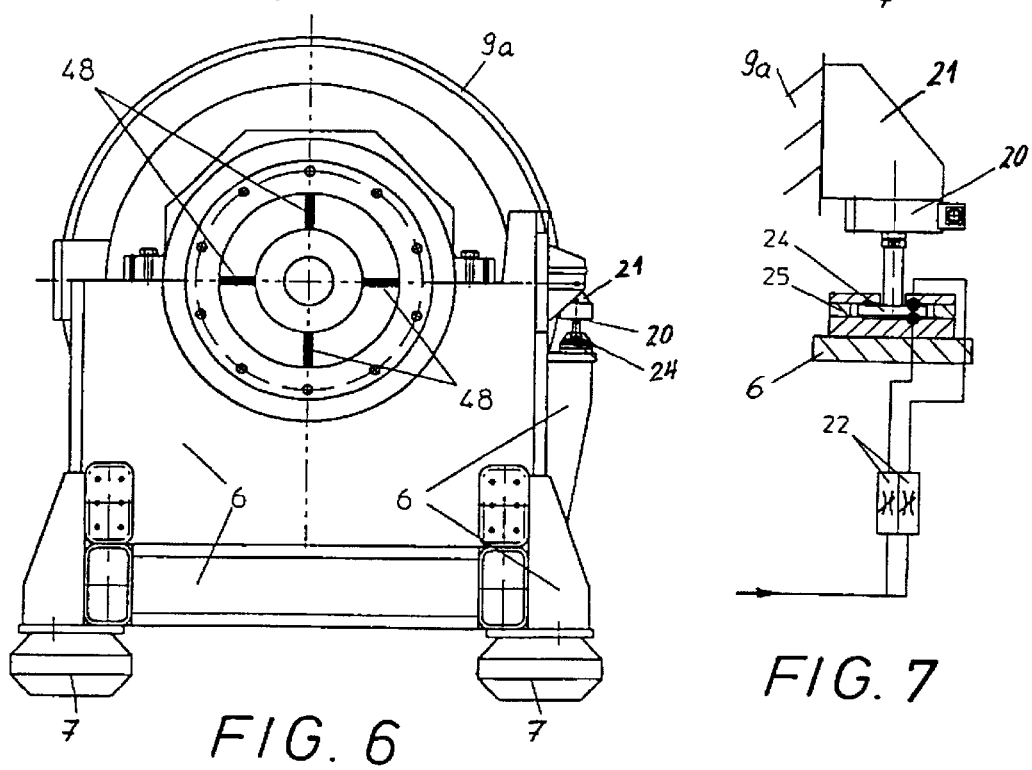
FIG. 6
FIG. 7

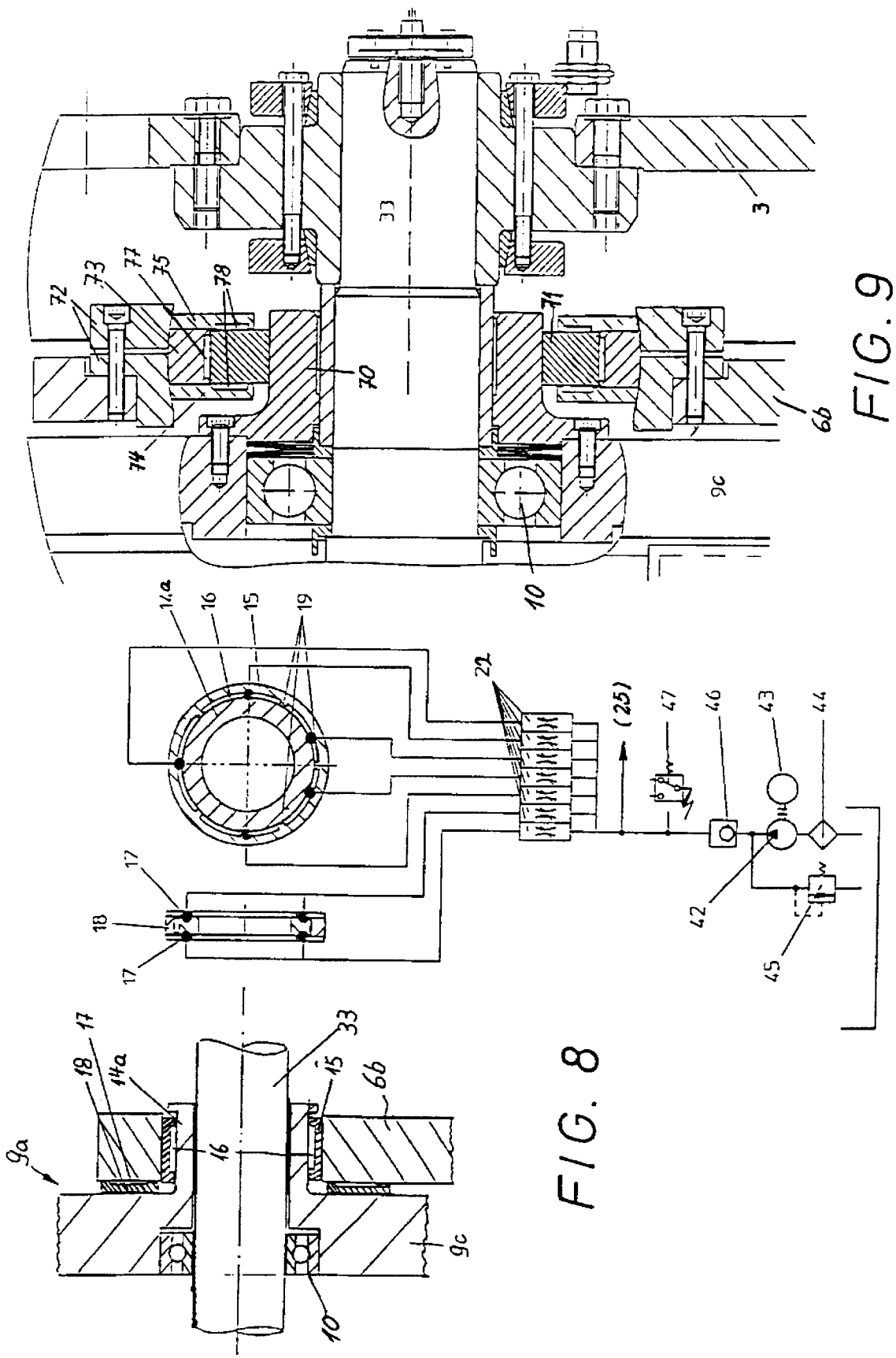

ROLLDYNAMOMETER

The invention relates to a rolldynamometer or drumdynamometer for motor vehicles of the type specified in the preamble of the patent claim 1 as well as a method for controlling a plurality of electric driving motors of rolldynamometers.

For testing dynamic driving parameters as well as exhaust gas values of motor vehicles driven by internal combustion engines complex rolldynamometers or drumdynamometers enabling a simulation of various driving conditions have recently been used. For carrying out tests concerning, for example, the braking functions, the exhaust gas emissions or the likes, the vehicle to be examined is fixed in the rolldynanometer, for example, by means of a rod assembly, while either the two wheels of one axis or the two wheels of a plurality of axes are resting on the crown area of a drum or a pair of rolls, respectively, depending on the design of the dynamometer. The drums or pairs of rolls are coupled with driving/decelerating motors associated with measuring elements for detecting the torques or tensile forces occurring in correspondence with the different test conditions.

In dynamometers used for examining vehicles having a so called four wheel drive, the running rolls or drums for the front wheels and the running rolls or drums for the rear wheels must rotate with equal speeds or circumferential speeds even when the driving speed for the examination changes, since in case of possibly occurring speed differencences between the front and rear pairs of running rolls control actions of the electronics incorporated in the vehicle might be caused. For example, the braking systems of motor vehicles are normally designed so that the braking action applied to the front wheels is stronger than the braking action applied to the rear wheels when the brake pedal is operated. When examining the function of the braking system of the vehicle to be tested, the front wheels with the stronger brake action applied thereto may delay the running rolls of the front test set more, which may cause the anti blocking apparatus of the vehicle to assume an excessive slipping of the wheels and reduce the braking force of the front wheels correspondingly. When, on the contrary, the driven axis and with its wheels the corresponding pair of running rollers becomes faster than the non driven axis during an acceleration operation, this may cause a reaction of the anti slip controller of the vehicle which will then reduce the output of the internal combustion engine. It is plain to see that such control actions will falsify the measurement results.

In a dynamometer designed for function tests for different operation parameters of so called four-wheel-drive vehicles therefore not only the tractive resistances expressed by A, B and C coefficients and the forces and momentums of the moving masses resulting from an acceleration or deceleration have to be detected and controlled, but also the circumferential speeds of the front and rear running rolls or drums must be kept equal, an angularly synchronous rotation of the front and rear running rolls or drums being considered optimal.

From the U.S. Pat. No. 5,452,605 a drumdynamometer for a motor vehicle having a one-axis-drive is known in which a single test set comprises two running drums and a central electrical driving motor borne in a common support frame and driving both running drums directly and synchronously. The stator housing of the driving or deceleration motor is pendulously borne in two vertical posts and additionally supported on the frame via a torque or force sensor. When, for example, during a brake test on the motor vehicle, the braking force transmitted to the running rolls by its braked-down wheels is introduced into the driving motor, the stator housing reacts with a torsion within the limits determined by the torque sensor, the reaction moment of the stator housing being detected by the torque or force sensor. Changes of the torque applied by the stator housing are thus detected as measurement values by the torque sensor. For bearing both sides of the stator housing in the support frame, the stator housing is provided with a hollow tappet on each end face, the rotor shaft connected to the two running drums being borne by internal anti-friction bearings in each hollow tappet. Opposed to the support frame each hollow tappet is borne by another radially outer anti-friction bearing. A drawback of this bearing arrangement is that during a stillstand of the driving motor no lubrication film is present in the anti-friction bearings and that the bearing bodies contact each other directly. This results in extremely high friction values during the start-up of the motor and to a premature damage to the bearing arrangement. This adverse effect is increased by the risk that the roll bodies may sink into the bearing shell due to the structure-borne noise present during the operation of the motor.

For overcoming these adverse effects it is known from the U.S. Pat. No. 5,522,257 to coaxially mount two anti-friction bearings above each other with a central ring interposed between them, the central rings being driven with a predetermined rotational speed via a belt drive before the driving motor is turned on for generating a lubrication film in the two antifriction bearings before the driving motor is activated. There exists, however, a drawback in that a force is introduced duced by the movement of the central rings of these bearings, which force is added to the torque to be measured during the examination. Additionally, the double bearings and the central ring including its rotational drive increase the technical requirements.

From the DE-B-39 20 277 a rolldynamometer for four-wheel-drive motor vehicles is known by which so called yawing moments about the vertical axis of the vehicle may also be simulated and detected. Each front wheel and each rear wheel of the motor vehicle to be examined are supported by a pair of rolls, respectively. To individually drive and brake the wheels, each pair of rolls is driven by an own driving motor, a torque sensor being disposed between each roll and the associated driving motor. The driving motors are preceded by power converters which are each instructed by an associated gain control amplifier. For measuring the rotational speeds of the individual motors, tachometer generators are provided, one tachometer generator, one gain control amplifier, one power converter and one driving motor being the components of one closed loop speed control circuit and all control circuits being connected to a processor formed as a process control computer or programmable control unit. For simulating running through curves the different circumferential speeds of the drums on the inner curve side and the outer curve side corresponding to these curves can be determined with the aid of said processor based on a desired running speed.

It is the object of the invention to provide a rolldynamometer or drumdynamometer providing more accurate measurement results with a less complex construction.

According to the invention, this object is solved by the stator housing of the driving motor being borne in the support frame by bearing arrangements which are virtually friction free even during the activation or start-up operation.

According to a particularly efficacious embodiment of the invention the bearing arrangements are provided with plain bearings of simple design into the bearing parts (bearing shells) of which pocket shaped or groove like cavities are machined to which a largely constant carrying pressure oil flow is applied. Between the sliding surfaces of each bearing a film like cushion of pressure means of high support capacity and negligible friction values with respect to the relatively small pendulum motions of the motor housing in the support frame develops, if required. The torque applied by the motor housing during an examination operation is thus detected by the force meter without errors. One of said bearing arrangements is efficaciously formed as an axially fixed bearing and has an axial pressure bearing with integrated pockets in addition to the radial pressure bearing provided with the support pockets. Due to this so to say floating bearing of the stator housing the friction influences occurring in conventional anti-friction bearings as well as the wear of the bearing parts are avoided. While introducing radial forces due to, for example, the weight of a supported vehicle, the respectively inner bearing shell is pressed down whereby the gap widths of the lower half of these support bearings are reduced and thus the supporting property is increased.

Efficaciously one bearing shell of each plain bearing may be provided with an inner sliding layer, respectively, if required of PTFE, in which sliding layer grooves are formed in a net-like form. The pressure means supplied through these flat groves forms a thin film of large dimensions having a high support capability and minimum friction values.

For generating the oil flows, either a separate pump segment may be used for each support pocket, or a common pressure oil supply having only a single pump and individual control elements for the individual partial flows may be used as an alternative of simpler design. By designing volume flow controlling valves, a constant pressure oil flow may be set for achieving an approximately medium bearing hardness, for achieving a relatively hard bearing position a flow increasing with an increasing counter-pressure may be set, or for achieving a soft bearing position a flow reduced with an increasing counter-pressure may be set. With these possible variations a remarkably enhanced running smoothness is achieved as compared to anti-friction bearings, which may be decisive, for example, in noise examinations on the vehicle to be tested.

Another bearing arrangement for the "pendulum bearing" of the stator housing is characterised in that on both sides a plurality of angularly offset compound spring elements elastic in the circumferential direction are fixed to a collar attached to the support frame with their radially outer end and to a protruding component of each face wall of the stator housing with their radially inner end. Said compound spring elements are designed so that they offer only a negligible resistance to the relatively small turning movements of the stator housing and almost exclusively receive weight forces.

For further increasing the accuracy of the measurements, the drumdynamometer according to the invention is further characterised in that the force meter disposed between the stator housing and the frame construction is formed as a load cell one functional element of which is provided with a piston being floatingly supported in a cylinder into which a pressure oil flow is introduced on both sides. Due to this floating support of the functional member of the load cell the measuring errors unavoidable with conventional supports due to the friction in the multi-joint rod assembly as well as jams in the telescope rod assembly are avoided. In the embodiments conventionally formed as knuckle eyes and functioning as simple plain bearings oblique forces which may falsify the results of the measurements are introduced into the load cell due to static friction. The load cell used for the dynamometer according to the invention is, on the one hand, attached to the pendulously borne stator housing of the driving motor or the support frame and, on the other hand, connected to the piston accommodated in the flat cylinder fixed either to the support frame or to the stator housing. A pressure oil flow supplied either by a separate pump or by the pressure oil supply for the bearing arrangements and preferably having a constant volume is applied to the upper side and the bottom side of the piston, respectively. The control or metering of the pressure oil volume and the appropriate liquid pressure is effected by appropriate control elements securing a floating support of the piston and preventing impacts on the cylinder wall.

A drumdynamometer according to the invention is characterised in that a stationary first test set and a second test set movable in the longitudinal direction are disposed in a common pit so that the position of the two test sets may be adjusted to the different wheel bases of the vehicles to be examined for examining vehicles provided with a plurality of driven axes, each test set consisting of a support frame, a central electric driving motor with its stator housing borne pendulously in the support frame and two lateral drums of large volume being directly and synchronously driven or decelerated by the motor shaft protruding on both sides.

For a supportive cover of the spaces in the pit resulting from the movements of the second test set, slatted flexible and laterally stiff carrying straps forming the drive-on strips of variable length required for driving on and off the examination tools are advantageously fixed to the drive-on plates of said second test set in the longitudinal direction.

To keep the pit depth small even in case of larger running distances, another preferred embodiment of the invention is characterised in that the free end portions of these carrying straps preferably consisting of link chains with carrier plates are respectively accommodated in a magazine within the pit in which they are deviated in an U-shaped fashion.

A dynamometer for testing motor vehicles driven through one axis with their on-board electronics (ABS, ASC, etc.) deactivated is characterised by a single test set of the above described construction longitudinally movable within a relatively long pit by means of a motor and provided with the slatted covers.

To prevent increased emissions of the structure-borne noise inherent to the dynamometer, in a further embodiment of the invention, each test set may be supported on the pit bottom in an oscillation-isolated manner. In addition, the drive-on plates including a respective centring means for the vehicle wheel driven on may be formed as separate modules and fixed on the pit crown independently of the respective test set. Due to this positional and constructive separation between each test set and the drive-on components there arises the possibility to provide the upper structure with additional noise or heat isolations. Particularly during tests in environmental chambers the test sets and their driving motors as well as the corresponding measuring means will not have to be exposed to the same low temperatures as the vehicle to be examined due to such an insulation.

A further development of the invention particularly advantageous with respect to the complexity of the design and the safety of operation is characterised in that, according to the invention, synchronous motors parallelly operated using frequency converters are used as driving motors instead of the so far used DC or asynchronous motors. The output frequency $f_d$ of the converter is determined in accordance with the following formula:

$$f_d = \frac{\sum F \cdot t}{m \cdot U \cdot P}$$

wherein:
 ΣF=sum of all forces (N)
 t=time (s)
 m=mass (kg) to be simulated
 U=circumference of the respective running drum (m)
 p=number of pole pairs of the synchronous motor.

On the basis of Newton's second law the examination speed is given by the sum of the occurring forces divided by the simulated vehicle mass. The shaft speed is derived from the diameter of the drums, and a direct relation between the obtained converter frequency and the test speed is obtained when the pole pair number of the driving motors is taken into consideration. Probes for detecting rotary speeds and/or speeds are not required, which is an important advantage as compared to the conventional systems provided with a plurality of tachometer generators.

The excitation of the synchronous motors may be effected via slip rings or via a magnetic transformer. Using permanently excited motors is particularly advantageous. To suppress the pendulum oscillations known from synchronous motors as much as possible special damper rods may be included, for example, as cage windings. Due to the external excitation of the motors all motor shafts are operated in a frequency synchronised manner, the undesired pendulum oscillations of the respective driving motor being minimised by the cage windings provided in addition to the permanent excitation.

Another particularly efficacious system for obtaining a synchronous operation of the driving motors and their associated running drums is characterised in that the rotating masses are increased or decreased by simulating forces corresponding to the respectively occurring angular accelerations, said forces being added to or subtracted from the mass inertia. The corresponding electrically simulated additional masses are calculated in accordance with the following equation:

$$F_{target} = F_{abc} + \left(m \cdot \frac{dv}{dt}\right).$$

$F_{target}$=the tensional force (N) to be applied by the driving motors
 $F_{abc}$=tensional force of the driving resistances (N)
 m=mass to be simulated
 dv=speed change
 dt=unit time The advantage of this simulation is that any small simulated masses or no simulated masses may be set. A disadvantage of the method known from the DE-B-39 20 277 is that not any small mass may be simulated since a mass of "zero" would result in a division by zero in the calculation method applied here. Correspondingly, the rotating masses of the dynamometer must be kept relatively small in this known method so that the masses to be simulated for the vehicle must be correspondingly large. This, however, leads to the drawback that the driving motors simulate a relatively large portion of the vehicle mass and therefore have to be correspondingly large sized. For enabling the utilisation of relatively smaller and cheaper driving motors and to obtain an enhanced reaction with higher accuracy, the difference between the mechanically rotating masses and the translational vehicle masses to be simulated should be kept as small as possible.

Incidentally, a synchronous operation of the drums for the front wheels and the drums for the rear wheels is required while the function of the mass simulation is to be secured. In a preferred system according to the invention this is obtained by a detection of the angles of rotation of the front and the rear driving motor. By subtracting these two angles of rotation an angle difference is obtained which is supplied to a PID-controller. The output signal generated by said PID-controller is added to the actuation signal for the one driving motor and subtracted from the actuation signal for the second driving motor. Thus the sum of the torques remains the same for the mass simulation.

Instead of the otherwise common incremental encoder, so called sine/cosine encoders are advantageously used as rotary angle sensors in the system according to the invention. Said sine/cosine encoders are advantageous as compared to the digital encoders in that a correspondingly high resolution for the angle difference is obtained from the analogous voltage value of the sine/cosine signal. From the sine/cosine signal a normal quadrature signal usable, for example, for the vector control of the respective driving motor can be regenerated by a simple Schmitt-trigger.

Instead of the rotational angle of the two driving motors the circumferential speeds of the two running rolls may also be subtracted from each other. The speed difference is applied to a PID-controller, as described above, and the actuation signal thus generated is added to the actuation signal of the driving resistance controller or subtracted from the respectively other side. In contrast to the angle control described above this system offers only two constant test speeds (no angular synchronism of the drums), however, only simpler speed measuring elements are required.

Further, the distances run by the two drums may be subtracted from each other. The difference between the distances is applied to a PID-controller, as described above, and the thus generated signal is added to the actuation signal of the tractive resistance controller for the one driving motor and subtracted for the second driving motor.

Further particularities and advantages of the invention will become obvious from the following description of preferred embodiments as well as the drawings in which:

FIG. 1 is a side view of a drumdynamometer according to the invention for testing two-track motor vehicles provided with two and four wheel drives;

FIG. 2 is a plan view of the drumdynamometer according to FIG. 1;

FIG. 3 is a schematic side view of a drumdynamometer for testing vehicles having a two-wheel drive;

FIG. 4 shows a drive-on and centring device in its operating position and in its inoperative position;

FIG. 5 shows a test set incorporated in a drumdynamometer according to FIG. 1 or FIG. 2;

FIG. 6 is a schematic front view of the test set according to FIG. 1;

FIG. 7 is an enlarged schematic view of a hydraulically supported pressure cell;

FIG. 8 is a schematic axial cross sectional view of an plain bearing arrangement for the stator housing;

FIG. 9 is an axial cross sectional view of another embodiment of a bearing arrangement for the stator housing;

Figure 10:
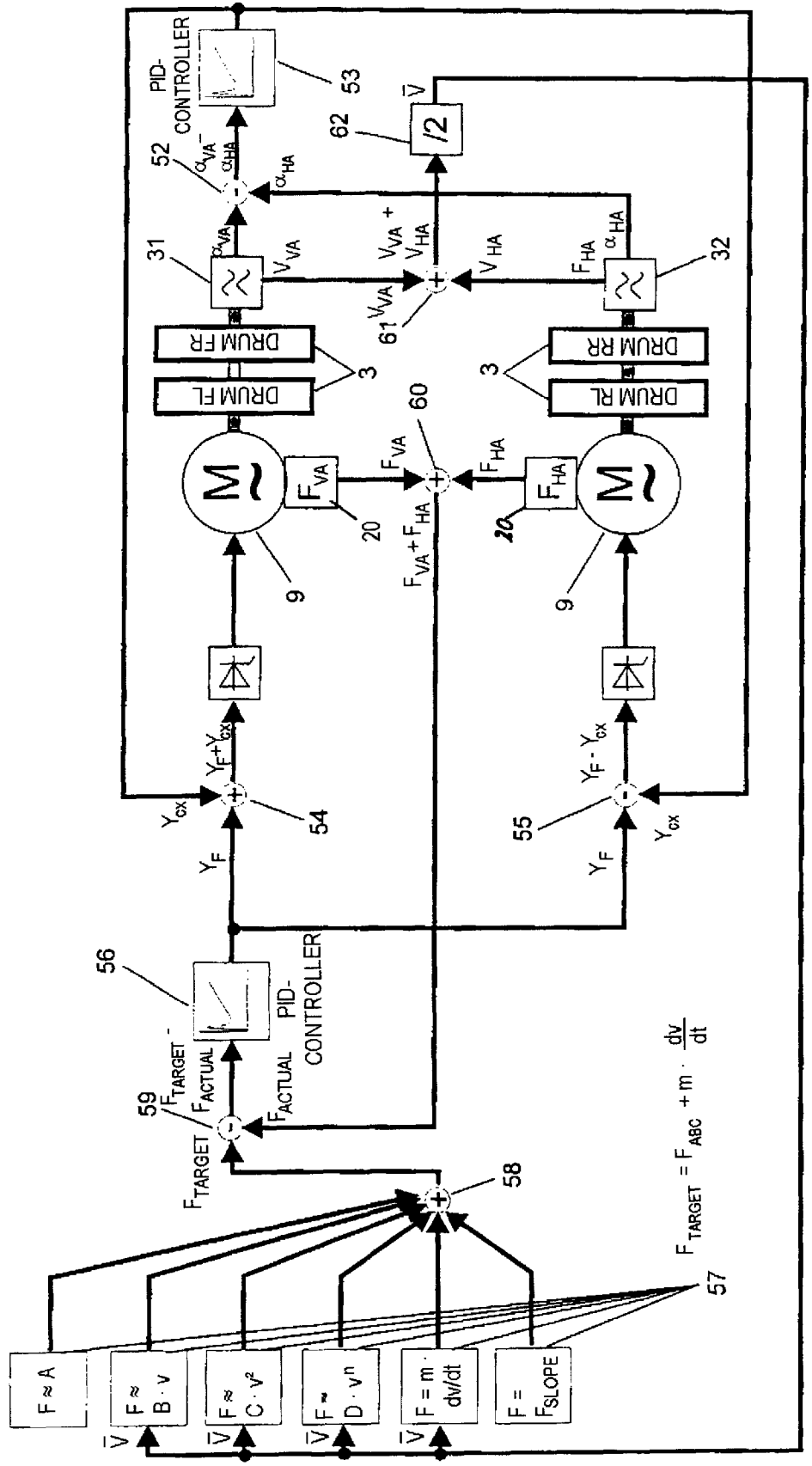
FIG. 10 is a control block diagram of two driving motors of a rolldynamometer.

The dynamometers described below are complex facilities preferably used by automobile manufacturers for examining a wide variety of vehicle parameters, particularly during the development of new vehicle types.

The drumdynamometer shown in FIGS. 1 and 3 is designed for testing two-track motor vehicles having one or two driven axes and provided with two test sets I and II disposed in a common pit III, one of said test sets I being fixedly mounted and the second test set II being longitudinally movable on an appropriate lower construction for an adjustment to different vehicle lengths. Each test set I and II comprises two drums 3 the diameter of which is equal to about twice the diameter of a vehicle wheel 2 here and a common driving motor 9 of the so-called floating type centrally disposed between the two drums 3 and directly driving both drums 3 via a common shaft 33 (see FIG. 5). The moving masses of the test sets are adjusted to the masses of the type of vehicle to be examined.

The drumdynamometer according to FIG. 2 is only provided with a single test set corresponding to the stationary test set I or the movable test set II according to FIGS. 1, 3 with respect to its design and function. The longitudinally movable embodiment enables the respective optimum execution of certain test operations without a change of the vehicle position.

In the dynamometer according to FIGS. 1, 3, after having positioned the longitudinally movable test set II in the position predetermined by the type of vehicle to be tested, a vehicle 1 is driven onto the dynamometer so that its front wheels come to rest on the crown area of one drum 3 of the test set II, respectively, and its rear wheels 2 come to rest on the crown area of one drum 3 of the first test set I, respectively. The positioning means shown in FIG. 4 are designed to exactly position the vehicle 1 or its wheels 2. Each of these positioning means is provided with two support poles 4 opposedly inclined in an acute angle and mechanically or hydraulically adjustable in the longitudinal direction so that their crowned free ends engage with the wheel or tire in the manner shown in FIG. 1. The support poles 4 may be set back to an inactive position below a respective drive-on plate 5 after the positioning operation.

As can be seen from FIGS. 1 to 3, the drive-on plate 5 forms an independent upper module separately fixed to the associated pit crown together with the positioning means 4, among others, respectively, without a mechanical link to the associated test set I or II. Thereby a mechanical and acoustic separation of the test sets from the support construction receiving the vehicle is obtained, which leads to a remarkable reduction of noise emissions and other undesired influences. For further reducing said influences the modules or their components 4, 5 may be provided with insulating or damping means.

For setting the predetermined position of the longitudinally movable test set II, a motor 26 engaging a stable component of the test set II via a linear drive 27, for example, a link chain, is fixedly mounted in the pit III. The test set II is supported by two longitudinal rails 28 disposed in the pit III with its support frame 6, on which rails 28 the test set II is movable by an operation of the motor 26.

As can be seen from FIG. 1 and the upper part of FIG. 3, a front and a rear stable link chain 13 with narrow profiled support plates 11, 12 are fixed on the two drive-on plates 5 of the test set II movable in the longitudinal direction. The length of the narrow support plates corresponds to the width of the drive-on plates 5. The link chains 13 and their support plates 11, 12 form the slatted drive-on strips in front of and behind the longitudinally movable test set II. On the right end of FIG. 1 as well as between the two test sets I and II a magazine 13a, 13b is provided in the pit III, respectively. Depending on the position of the test set II, one of the end portions of the front or rear link chain 13 including the support plates is respectively received in one of these magazines 13a, 13b while forming a loop as shown in FIG. 1. The magazines thus enable a relatively small depth of the pit III even in the case of long moving distances of the test set II.

In FIGS. 5 and 6 an embodiment of a test set is shown in detail. The test set is provided with a stable support frame 6 which may either be fixed to the stationary lower construction (the test set I) or to the lower construction (the test set II) movable by the linear drive 27. For damping or insulating the support of the respective test set may be effected via damping elements 7.

Between two stable support walls 6a, 6b of the support frame 6 the driving motor 9 preferably formed as an electric synchronous motor is disposed, a drum 3 being fixed to each of the two laterally protruding ends of the shaft 33 said driving motor 9, respectively. The stator housing 9a of the driving motor 9 is provided with an anti-friction bearing 10 for the shaft 33 and a protruding bearing hull in each face wall 9b, 9c, the radially inner ends of four compound springs 48 angularly displaced by 90°, respectively, being fixed to said bearing hull. The radially outer ends of these spring elements 48 acting as strap retainers are fixed to a collar fixedly mounted in a circular opening in the respective support wall 6a, 6b.

The compound springs 48 form an all-round suspension for the assembly consisting of the driving motor 9 and the two drums 3 in the support frame 6, said compound springs only transmitting the weight forces of said assembly 3, 9 into the support frame. The compound springs 48 are designed and adjusted so that they will not or only negligibly influence the small turning movements of the stator housing 9a of the driving motor 9 occurring during test operations.

Another bearing arrangement of the stator housing 9a in the one wall 6b of the support frame 6 is schematically shown in an axial cross section and in a cross sectional view together with a pressure oil supply. The shaft 33 is borne in an anti-friction bearing 10 of the respective face wall 9b, 9c. A shell 14a formed on the respective face wall 9b or 9c forms a radially inner plain bearing element. In an opening of the support wall 6b a bearing ring 15 is fixed in which pockets 16 distributed along the circumference and separated by lands 19 are formed. In the left axial cross sectional view of FIG. 8 another bearing ring 18 disposed between the outer surface of the face wall 9c of the stator housing 9a and the lateral surface of the side wall 6b facing the same of the support frame 6 is shown. This bearing ring 18 also has groove shaped oil pockets 17 on one or both end faces. The oil pockets 16, 17 are supplied with pressurised liquid through separate lines.

The torque support of the stator housing 9a is effected via a power cell 20 fixed to a lateral projection 21 of the stator housing according to FIGS. 6, 7. The functional member of said power cell 20 is connected to the piston 24 floatingly accommodated in a flat cylinder 25 fixed to the support frame 6 via a rod. A controlled pressure oil flow supplied by a pressure oil supply schematically shown in FIG. 8 via control valves or from an independent supply means is supplied to each piston end face.

The pressure oil supply for the plain bearings 14, 15, 18 and for the piston 24 of the hydraulic support of the power cell 20 comprises an oil pump 42 driven by a motor 43, sucking hydraulic oil from a reservoir via a filter 44 and forcing it into the duct system via a check valve 46 in the preferred embodiment. The surplus hydraulic oil is returned to the reservoir from the bearing positions via a pressure control valve 45 ensuring a sufficient and, if necessary, adjustable hydrostatic pressure in the bearing part. For individually metering and controlling the pressurised oil flow to the various bearing positions and to the cylinder, control components 22 are included in the branch lines. A pressure switch 47 in a re turn line ensures an oil pressure in the plain bearings 14, 17 sufficient for a friction free bearing as well as preferably a flow of a constant volume for a floating support of the piston 24 in the cylinder 25. The oil leaking from the bearing positions or the cylinder is returned to the reservoir by return lines (not shown).

Another embodiment of the plain bearing arrangement is shown in an enlarged axial cross sectional view in FIG. 9. As in the plain bearing arrangement described above, the shaft 33 is also borne in the face walls 9b, 9c of the stator housing 9a in a respective anti-friction bearing 10 in this embodiment. On the outer side of the bearing hole in the face wall 9c a bearing shell 70 is flange-mounted, a bearing ring 71 resting on said bearing shell 70. In the accommodation opening of the support wall 6b a two-piece straining ring 72 having an arcuate inner surface is disposed, said straining ring 72 surrounding a bearing ring 73 and two adjacent bearing disks 74, 75 each having crowned outer surfaces. By tightening straining screws 76, the straining ring 72 is fixed to the support wall 6b, a clamping of the two bearing disks 74, 75 and the bearing ring 73 in an optimum orientation being effected at the same time. Groove-shaped oil pockets 77, 78 which are in flow connection with a pressure oil supply described above are formed in the two bearing disks 74, 75 and in the bearing ring 73.

In the bearing arrangement of FIG. 8 and 9 a hydraulic pressure is built up in the oil pockets before the driving motor 9 is activated so that the stator housing 9a is borne in the two support walls 6a, 6b of the support frame 6 without friction and virtually without play. The turning movements of the stator housing 9a occurring during test operations can thus be introduced into the pressure cell 20 without loss, whereby the accuracy of the torque detection is remarkably increased.

The control of the driving motors of the dynamometers will be described below with reference to FIGS. 10 and 11.

A tractive resistance simulator 57 schematically shown on the left side of FIG. 10 calculates the load selected for the respective test vehicle depending on the running speed. In addition, based a speed change, for example, an acceleration, a signal is generated which is calculated by multiplying the difference between the desired mass to be simulated and the basic mass of the rotating components of the dynamometer with the acceleration in correspondence with the equation shown. The tractive resistance values are added in an adder 58 the output value of which is the target force for a tractive resistance controller 56.

In a subtractor 49 the target force obtained from the tractive resistance simulator 57 is compared with the actual forces generated by the power cells 20 and summed up by an adder 60. The difference signal F-target minus F-actual is applied to the tractive resistance controller 56 the actuating amount $Y_f$ of which is the actuating amount for the driving motor 9. Two speed sensors 31, 31 detecting, for example, the rotational speed of the respective shaft of the first or second test set calculate a mean value 62 of the speed by means of an adder 61. Said speed sensors 31, 31 are preferably formed as sine/cosine-transmitters so that the angles of the respective driving shaft 33 can be obtained from these sensor signals. In a comparator 52 the angle difference of the two motor shafts 33 is calculated by means of a subtraction. Said angle difference is applied to the controller 53. The output of the controller 53 is now added to the actuation signal of the tractive resistance controller 56 in the node 4 at the drum for the front wheel. At the same time, the actuation signal of the controller 53 is subtracted from the actuation signal of the controller 56 in the subtractor 55. The torque signal thus added on the one side is subtracted on the other side so that the control signal generated by the tractive resistance controller 56 remains unchanged with respect to the sum.

Figure 11:
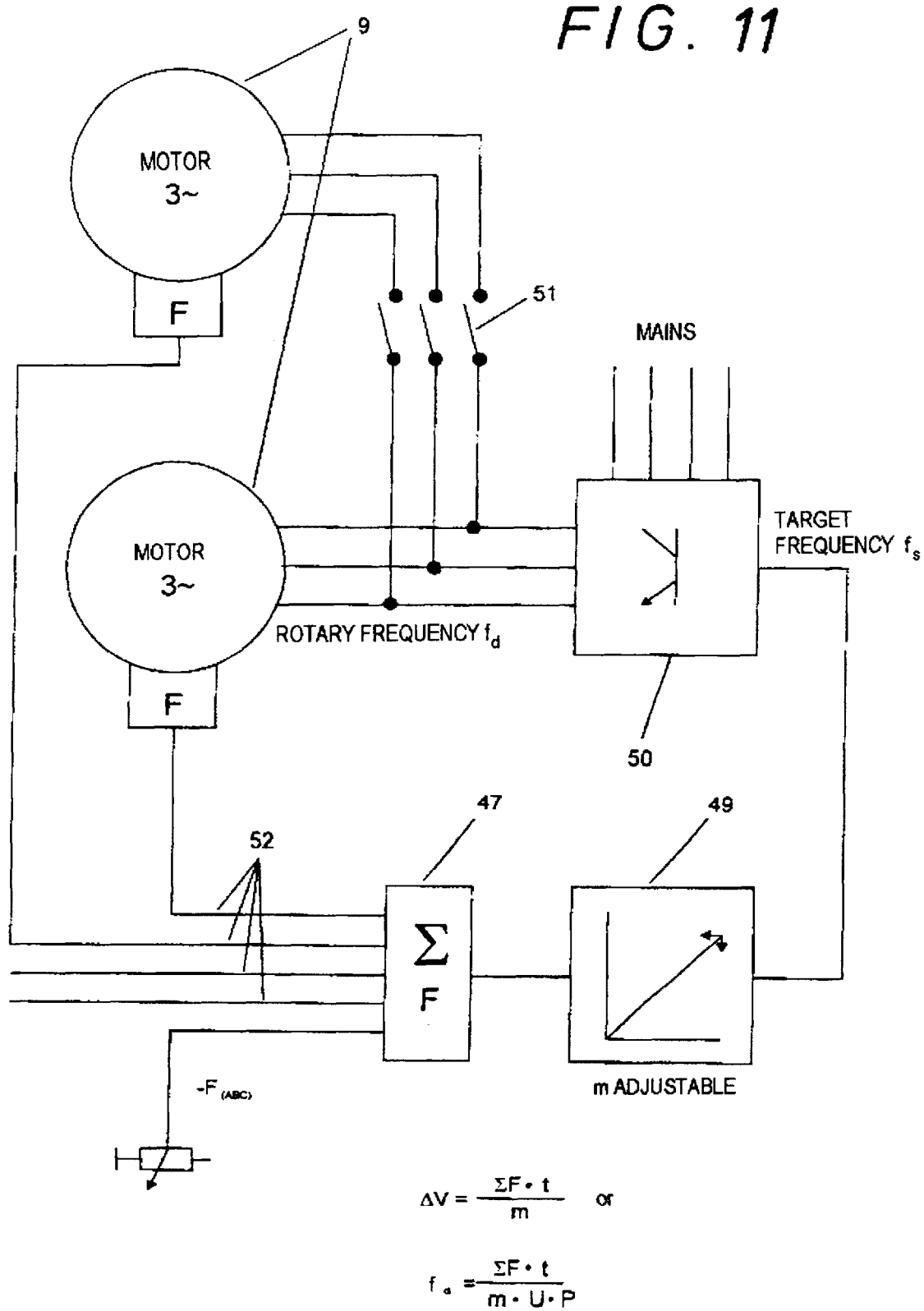
FIG. 11 is a block diagram of another control unit for the two driving motors of a drumdynamometer.

The control of the synchronous motors shown in FIG. 11 does not require incrementors or tachometer generators as speed measuring means. The forces F or the driving motors 9 and the set tractive resistances $F_{abc}$ are added in an adder 47, and the resulting sum is divided by the adjustable mass m to be simulated in the member 49, whereby a drum circumferential speed is obtained. The thus calculated target speed is translated into a shaft speed corresponding to the respective drum diameters and into an output frequency corresponding to the pole pair number of the synchronous driving motors 9 by one or more frequency inverters, said output frequency being applied to the synchronous motors 9. The rotary angle of all driving motors is fixedly coupled to the operating frequency due to the design. Therefore, the otherwise common speed measurement may be omitted. The required excitation power for the synchronous motors may be supplied via slip rings. The synchronous motor may also be provided with a continuous excitation. Finally, in addition to the continuous or external excitation, a cage winding for suppressing the pendulum oscillations common to synchronous motors may be allocated to the synchronous motors.

According to the formulas of FIG. 11, the test speed is calculated by dividing the sum of all forces by the masses to be simulated. From this calculated test speed a target frequency fs corresponding to the diameter of the drums 3 driven by the synchronous motors and the number of pole pairs of said synchronous motors is calculated, said target frequency fs being converted into a rotary current signal having a rotary frequency $f_D$ corresponding to the target frequency by the frequency inverter 50. The synchronous driving motors 9 are parallelly operated in this frequency inverter. Switching from the two-wheel drive to the four-wheel drive operation is possible simply with a contact switch 51. A measurement of the actual drum speeds is not required since the target frequency does not permit any deviation due to the direct coupling of the synchronous motors 9 to the rotary frequency. This means that the target speed calculated by means of the formula shown in FIG. 11 at the same time corresponds to the actual speeds.

On the drumdynamometers described above examinations and tests are also carried out in extremely high or extremely low temperatures, for example, in environmental chambers, to detect the properties and the behaviour of the vehicles and their individual components during operation in extreme environmental conditions. To obtain practice-oriented results even under such conditions the invention is designed to include the respective environmental temperature and also the prevailing air pressure in the simulation as influential parameters. Thereby the fact is taken into consideration that the loss characteristic is essentially determined by the so-called ventilation losses in the dynamometer of the invention since there are practically no other loss components due, for example, to bearing friction or the likes in this dynamometer. Said ventilation losses are directly proportional to the air density which in turn is calculated from the temperature and the prevailing air pressure. For including changes of the air density in the genuine simulation of the ventilation losses, the dynamometer is operated under predetermined conditions at a normal temperature and at a normal air pressure during a scaling operation, and the values of the detected ventilation losses for the respective speeds are stored. When a test operation is carried out under other temperature or air pressure conditions, the changing ventilation losses may then be determined based on the stored values and also considered as simulation parameters.

What is claimed is:

1. Dynamometer for motor vehicles, particularly vehicles having a plurality of driven axes, comprising:
    a plurality of test sets (I and II) each comprising of two drums (3), a support frame (6) and an electric driving/breaking motor (9) for directly driving or slowing down the drums, borne in the support frame (6) between the two drums (3) in a pendulum fashion and disposed in at least one pit (III), at least one of said test sets (I or II) being movable in a longitudinal direction and driving motors of the two test sets (I and II) being electrically synchronised, with at least one running drum for each wheel of at least one axes of a vehicle to be examined,
    a stator housing of said electric motor is supported on said support frame by way of a force meter and
    a control unit for the electric driving motors connected to a running simulator for setting specific vehicle data and for simulating selected running conditions, characterised in that
    the stator housing (9a) of the respective electric driving motor (9) is borne in the support frame by way of a bearing arrangement (15–18; 72–78; 48) with minimal friction even during activation or start-up operation and, further characterised in that
    a sine/cosine sensor (31, 32) to accurately detect an angular position or angular speed of a motor shaft (33) is allocated to each driving/breaking motor (9).

2. Dynamometer according to claim 1, characterised in that the bearing arrangement (15–18, 72–78) comprises bearing shells (15, 18; 73, 75) having pressure liquid pockets (16, 17; 77, 78) incorporated therein into which a pressure oil flow of an approximately constant volume is introduced.

3. Dynamometer according to claim 2, characterised in that the pressure liquid pockets (16, 17; 77, 78) are connected to a pressure liquid supply (42 to 47) comprising at leat a pressure generator (42, 43) and actuators (45) by way of controllable metering members (22).

4. Dynamometer according to claim 1 characterised in that each bearing arrangement comprises two supporting radial pressure bearings (14, 16; 71, 73) for the face walls (9b, 9c) of the stator housing (9a), pressurised liquid being introduced into said radial pressure bearings (14, 16; 71, 73), as well as at least one lateral axial pressure bearing (17, 18; 74, 75, 78).

5. Dynamometer according to claim 1, characterised in that on the face walls (9b, 9c) of the stator housing (9a) hulls (14; 70) are fixed which are protruding on both sides and support a functional member (71) of a respective plain bearing.

6. Dynamometer according to claim 1, characterised in that control elements in the form of throttle valves or capillaries showing negligible volume flow changes between an entrance and an exit in case of pressure differences are allocated to the bearings (15, 18).

7. Dynamometer according to claim 1, characterised in that the bearing arrangement comprises a plurality of angularly displaced compound spring elements (48) which are elastic in a circumferential direction and fixed to a collar fixed in the support frame (6) with their radially outer end and to a component of a respective face wall (9b, 9c) of a housing with their radially inner end.

8. Dynamometer according to claim 1, characterised in that the force meter disposed between the stator housing (9a) and the support frame (6) of each test set (I, II) is formed as a power cell (20) one functional member of which comprises a piston (24) supported in a floating and contact free manner in a cylinder (25) into both sides of which a pressure oil flow is introduced.

9. Dynamometer according to the preamble of the patent claim 1 in which at least one test set (I, II) formed of two drums (3), a central driving/breaking motor (9) and a support frame (6) is disposed in a pit (III), characterised in that the test set (I, II) is supported on a lower construction in a vibration isolated manner by way of dampers (7) and an upper structure (4, 5) forming the two drive-on strips for the vehicle (1) to be examined is separately fixed to an upper end of the pit (III).

10. Dynamometer according to claim 9, characterised in that a thermal and/or acoustic insulation is provided between the test set (I, II) and the upper structure (4, 5) forming the drive-on strips.

11. Dynamometer according to the preamble of claim 1, characterised in that at least one test set (II) is disposed in a pit (III), said test set (II) being longitudinally movable by means of a motor, while slatted flexible transversely stiff support strips (11, 12, 13) are fixed to its drive-on plates (5) in the longitudinal direction, free end sections of said support strips being accommodated in a magazine (13a, 13b), respectively.

12. Method for examining motor vehicles on a rolldynamometer or drumdynamometer according to which front and rear wheels of a vehicle to be examined are positioned on front and rear drums which are, in pairs, directly driven or decelerated by an electric driving/breaking motor, respectively,
    comprising the steps of:
        rotational speeds of two driving motors measuring,
        an angle difference obtaining by subtracting measured phase angles of driving motors for synchronising two drives,
        said angle difference applying to a PID-controller, and an actuation generating signal which is added to an actuation control value of a first driving motor and subtracted from the actuation control value of a second driving motor and, characterised in that
        the rotational speed of the driving motors measuring by sensors (31, 32) providing an analogous sine/cosine output.

13. Method according to claim 12, characterised in that instead of the angle difference a speed difference is obtained by subtracting circumferential speeds of the front and rear drums.

14. Method according to claim 12, characterised in that instead of the angle difference a distance difference is obtained by subtracting two circumferencial distances.

15. Method according to claim 12, characterised in that the signal generated by the PID-controller is applied to one driving motor in phase and to a second driving motor anti-phase.

16. Method according to claim 12, characterised in that quadrature signals available as actual values for vector controllers of the driving motors are generated from the sine/cosine signals by way of Schmitt-triggers.

17. Method according to claim 16, characterised in that a cage winding is used in addition to continuous or external excitement for suppressing pendulum oscillations common to synchronous motors.

18. Method according to claim 12, characterised in that the analogous sine/cosine-signals are digitised by means of A/D-converters.

19. Method according to claim 18, characterised in that a cage winding is used in addition to the continuous or external excitement for suppressing the pendulum oscillations common to synchronous motors.

20. Method according to claim 12, characterised in that a temperature and air pressure of an environment of a dynamometer are measured and correction and compensation values are determined by comparison with stored calibration values for taking climatic conditions into account in a determination of parasitic losses.

* * * * *